C. F. SNYDER.
CONNECTION OR JOINT AND METHOD OF MAKING SAME.
APPLICATION FILED JUNE 14, 1919.
1,348,667.
Patented Aug. 3, 1920.
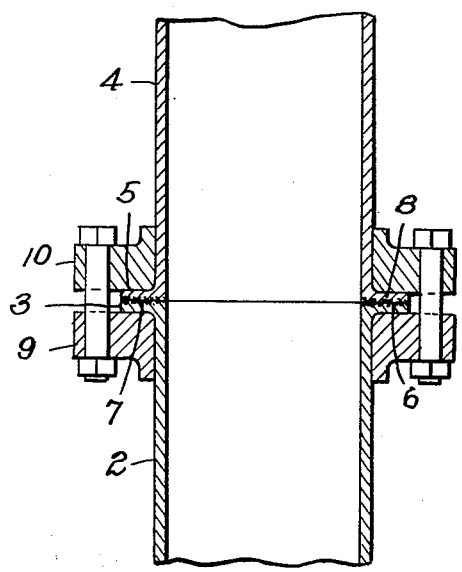
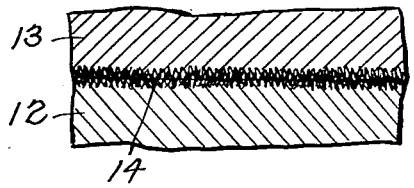
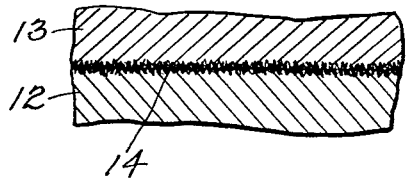
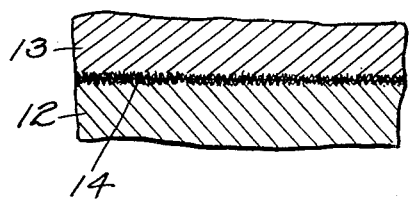
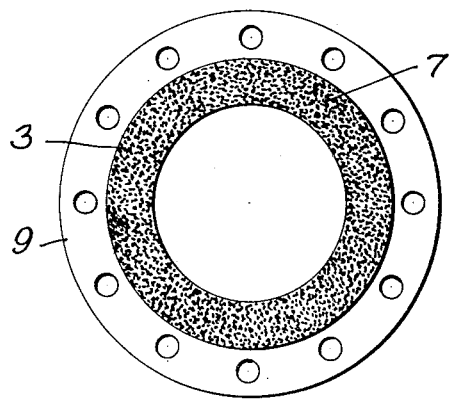
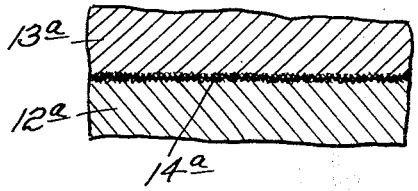
WITNESSES
INVENTOR
Charles F. Snyder

UNITED STATES PATENT OFFICE.

CHARLES F. SNYDER, OF PITTSBURGH, PENNSYLVANIA.

CONNECTION OR JOINT AND METHOD OF MAKING SAME.

1,348,667.     Specification of Letters Patent.     Patented Aug. 3, 1920.

Application filed June 14, 1919. Serial No. 304,178.

*To all whom it may concern:*

Be it known that I, CHARLES F. SNYDER, a citizen of the United States, residing at Pittsburgh, in the county of Allegheny and State of Pennsylvania, have invented certain new and useful Improvements in Connections or Joints and Methods of Making Same, of which the following is a specification.

An object of the present invention is to provide a new and improved joint and a method of producing the same.

While the joint constituting my invention is particularly directed to joints designed for use in connection with high pressure fluids and superheated steam lines, it may be advantageously employed for low pressure work.

It is well known to engineers that considerable trouble is encountered with joints heretofore employed for high pressure work due mainly to the destruction and blowing out of the gaskets or cement, or both, now so generally employed in this class of construction. The cost of gaskets or cement or both now necessarily employed in high pressure work is also considerable.

A further object of the present invention is to provide a simple and efficient joint that may be used without gaskets or cement for high pressure work; also to provide a joint capable of being employed in combination with gaskets or cement or both in connection with low pressure work. In the last mentioned instance, I am enabled to employ considerably cheaper gaskets, and at the same time provide a more efficient joint than has heretofore been possible.

I am aware that prior to my invention attempts have been made to form the abutting or contacting surfaces or faces of joint members in such a manner as to aid in retaining the gaskets or cement and thus prevent a leak at the joint, such for example, as concentric rings, ridges, and corrugations. My invention, however, should be distinguished from such constructions for the reason that, particularly in high pressure work, I do not employ gaskets and therefore do not treat the abutting surfaces for the same purpose or in a manner similar to what has heretofore been done.

In addition to providing a joint for the adjacent ends of two pipe sections, my invention is applicable for use for connecting cylinders and their heads; flanged valves; and various fittings employed in both low and high pressure work requiring a tight efficient connection.

In carrying out my method of making the joints of the present invention, the abutting or contacting surfaces of the two or more metallic members constituting the joint members, are first preferably machined or otherwise treated to form smooth even surfaces. After treating the surfaces as described, the said smooth even surfaces or contacting faces are subjected to the action of a suitable cutting, indenting, or roughening tool to change the smooth surfaces into granular or granulated surfaces of the desired grain. The granular surface may be of fine or coarse, loose or tight grain, depending upon the character of the connection or joint, and to some extent whether gaskets or cement are to be employed.

In some instances, as for example, where the joint is to employed for low pressure work, I may omit the operation of machining the contacting faces of the joint members prior to producing the granulated surfaces or faces.

In the accompanying drawings which illustrate applications of my invention,

Figure 1 is a longitudinal sectional view of a flanged lap joint construction embodying my invention;

Fig. 2, a face view of one of the front members;

Figs. 3, 4 and 5, diagrammatic sectional views showing granular contacting surfaces or faces on joint members; Fig. 3 showing the granulated surfaces in contact but before pressure has been applied; Fig. 4 after some pressure; and Fig. 5 after considerable pressure has been applied; and Fig. 6, a view similar to Fig. 3 showing the granulated faces of the members of less depth than the faces of Fig. 3.

Referring first to the form of Fig. 1, 2 designates an end of a section of a pipe having a facing flange or lap 3, and 4 an adjacent pipe section having a facing flange or lap portion 5.

The face, contacting or abutting surface 6 of lap portion 3, is granulated, pitted, or roughened, as indicated at 7, and the corresponding face of lap 5 has a surface 8 similar to surface 7 of lap portion 3.

9 and 10 designate connecting flanges of the usual construction provided with bolt holes to receive bolts 11.

In the diagrammatic views I have shown by Fig. 3 two members 12 and 13 each formed with a granular surface 14; and Figs. 4 and 5 show these same members pressed together. Fig. 5 shows the appearance of the granulated surfaces when considerable pressure has been applied and the said surfaces squeezed together. Fig. 4 particularly shows the appearance of the granular surface in cases in which less pressure has been applied.

In Fig. 6 the members 12ª and 13ª are each formed with a granular surface 14ª of finer grains and of less depth than the surfaces of the form of Fig. 3. The granular surfaces shown are somewhat enlarged for the purposes of clearly showing my invention.

The granulated contacting faces of the joint members will prevent the members moving relatively to each other after being coupled together and will maintain a tight joint without undue strain on the bolts and flanges.

What I claim is:—

1. The herein described method of preparing the meeting surfaces of metallic members for use in a joint structure which consists in treating said surfaces to produce a granular contacting surface on each member.

2. The herein described method of preparing the meeting surfaces of metallic members for use in a joint structure, which consists in first machining said surfaces and then treating them to produce a granular contacting surface on each member.

3. A joint structure including two metallic members each having a granular contacting surface.

4. A joint structure including two metallic members each having a granular contacting surface and means for securing the said members together.

5. A joint structure including two metallic flanged members with the contacting face of each flange having a granulated surface.

6. A joint structure including two metallic flanged members with the contacting face of each flange having a granulated surface and means for securing the flanges together.

7. A joint structure including a metallic member having a granular contacting surface.

In testimony whereof I affix my signature in presence of two witnesses.

CHARLES F. SNYDER.

Witnesses:
J. M. GEOGHEGAN,
LOIS WINEMAN.